(12) United States Patent
Chang et al.

(10) Patent No.: US 11,513,067 B2
(45) Date of Patent: Nov. 29, 2022

(54) SPECTROMETER

(71) Applicant: InnoSpectra Corporation, Hsin-Chu (TW)

(72) Inventors: Fei-Peng Chang, Hsin-Chu (TW); Nan-Yu Chen, Hsin-Chu (TW); Hsi-Pin Li, Hsin-Chu (TW)

(73) Assignee: InnoSpectra Corporation, Hsin-Chu (TW)

( * ) Notice: Subject to any disclaimer, the term of this patent is extended or adjusted under 35 U.S.C. 154(b) by 0 days.

(21) Appl. No.: 17/180,632

(22) Filed: Feb. 19, 2021

(65) Prior Publication Data

US 2021/0262928 A1  Aug. 26, 2021

(30) Foreign Application Priority Data

Feb. 26, 2020  (CN) .......................... 202010118329.3

(51) Int. Cl.
  *G01J 5/02*   (2022.01)
  *G01N 21/3577*   (2014.01)
  *G01N 21/01*   (2006.01)

(52) U.S. Cl.
  CPC ......... *G01N 21/3577* (2013.01); *G01N 21/01* (2013.01)

(58) Field of Classification Search
  CPC ..... G01N 21/3577; G01N 21/01; G01N 21/25
  See application file for complete search history.

(56) References Cited

U.S. PATENT DOCUMENTS 5,059,394 A * 10/1991 Phillips .............. G01N 21/8483
422/68.1

FOREIGN PATENT DOCUMENTS

| CA | 2068891 A1 | * | 5/1991 | .............. B01L 9/527 |
|----|----|----|----|----|
| CN | 207832666 | | 9/2018 | |
| CN | 109874316 A | * | 6/2019 | |
| CN | 111751301 | | 10/2020 | |

* cited by examiner

*Primary Examiner* — Kiho Kim
(74) *Attorney, Agent, or Firm* — JCIPRNET

(57) ABSTRACT

A sample carrier is provided for carrying a liquid sample to be measured by a spectrometer. The sample carrier includes a frame body and a mesh-like carrier body. The frame body has a notch located at the bottom of the frame body. The mesh-like carrier body is fixed to the frame body and located at the notch, the mesh-like carrier body has a plurality of apertures, and the liquid sample is retained in at least some of the apertures. Also provided is a spectrometer including the sample carrier. The sample carrier is capable of carrying the liquid sample and allows simple light path control.

11 Claims, 10 Drawing Sheets

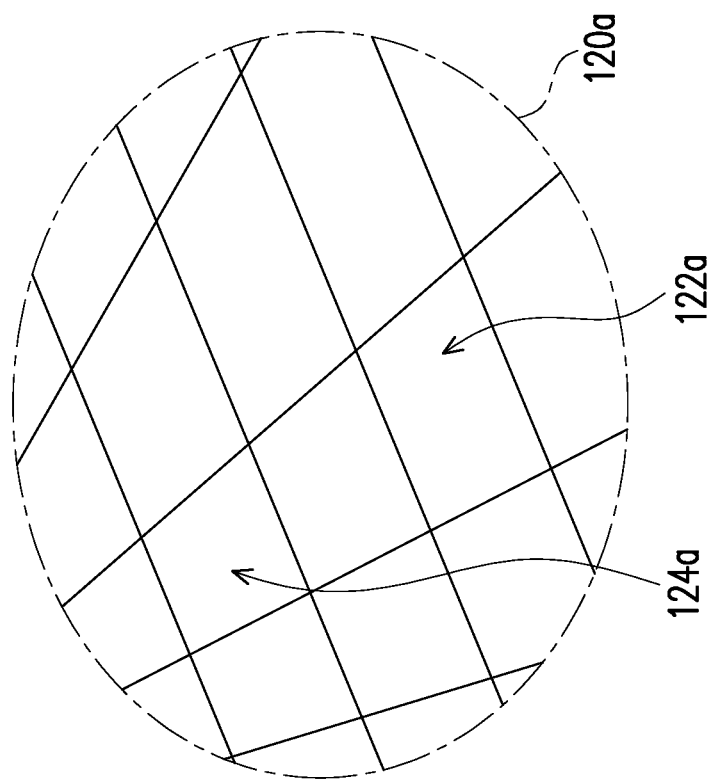

SPECTROMETER

CROSS-REFERENCE TO RELATED APPLICATION

This application claims the priority benefit of China application serial no. 202010118329.3, filed on Feb. 26, 2020. The entirety of the above-mentioned patent application is hereby incorporated by reference herein and made a part of this specification.

BACKGROUND OF THE INVENTION

1. Field of the Invention

The invention relates to a sample carrier and a spectrometer, and particularly relates to a sample carrier capable of carrying a liquid sample and a spectrometer.

2. Description of Related Art

In spectrum measurements, light transmittance may vary among samples of different types. For liquid samples with low light transmittances, such as milk or soy milk, such samples need to be provided with a very small thickness (short light path) to ensure enough light passing through. For liquid samples of this kind, a conventional process is to put such liquid sample in a cuvette having a short light path. However, a cuvette is expensive and difficult to clean.

In another process, two glass cover slips are used to hold a liquid sample by using cohesive force. The thickness of the liquid sample under such condition may be reduced to 0.1 millimeter to 0.2 millimeters, thereby shortening the light path. However, the glass cover slips are fragile and the light path is difficult to control.

In yet another processes, two glass pieces are used, one of which is a flat glass piece, while the other is one provided with a groove. The liquid is dripped onto the glass piece with a groove and then covered by the flat glass piece. Then, a clamp is used to fix the glass pieces to avoid detachment thereof. In this way, the light path may be shortened by using a shallow groove (e.g., one with depth of 0.1 millimeter). However, the cost thereof is high, and the components are fragile and difficult to clean.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY OF THE INVENTION

Other objectives, features and advantages of the present invention will be further understood from the further technological features disclosed by the embodiments of the present invention wherein there are shown and described preferred embodiments of this invention, simply by way of illustration of modes best suited to carry out the invention.

Embodiments of the invention provide a sample carrier capable of carrying a liquid sample and allowing simple light path control.

Embodiments of the invention provide a spectrometer having the sample carrier.

An embodiment of the invention provides a sample carrier for carrying a liquid sample to be measured by a spectrometer. The sample carrier includes a frame body and a mesh-like carrier body. The frame body has a notch located at the bottom of the frame body. The mesh-like carrier body is fixed to the frame body and located at the notch, the mesh-like carrier body has a plurality of apertures, and the liquid sample is retained in at least some of the apertures.

An embodiment of the invention provides a spectrometer including a light source assembly, a transmissive sampling module, and an optical engine. The light source assembly is configured to provide a beam. The transmissive sampling module includes a supporting base and a sample carrier. The supporting base is disposed on a light path of the beam of the light source assembly. The sampling carrier is configured to carry a liquid sample and pluggably disposed inside the supporting base. The sample carrier includes a frame body and a mesh-like carrier body. The frame body has a notch located at the bottom of the frame body. The mesh-like carrier body is fixed to the frame body and located at the notch. The mesh-like carrier body is located on the optical path of the beam of the light source assembly. The mesh-like carrier body has a plurality of apertures, and the liquid sample is retained in at least some of the apertures. The optical engine is configured to be connected to the transmissive sampling module. The beam of the light source assembly passes through the liquid sample on the mesh-like carrier body to be emitted toward the optical engine.

Based on the above, in the sample carrier of the spectrometer according to the embodiments of the invention, the mesh-like carrier body carries the liquid sample. Specifically, the mesh-like carrier body has a plurality of apertures, and the liquid sample may be retained in at least some of the apertures. Since the thickness of the liquid sample can be controlled through the thickness of the mesh-like carrier body, the light path can be favorably controlled within a thin range. In addition, the mesh-like carrier body may be disposed on the light path of the beam. In this way, the beam may pass through the liquid sample on the mesh-like carrier body and be emitted toward the optical engine, so as to measure the liquid sample.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 5 is a schematic view illustrating a mesh-like carrier body according to another embodiment of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
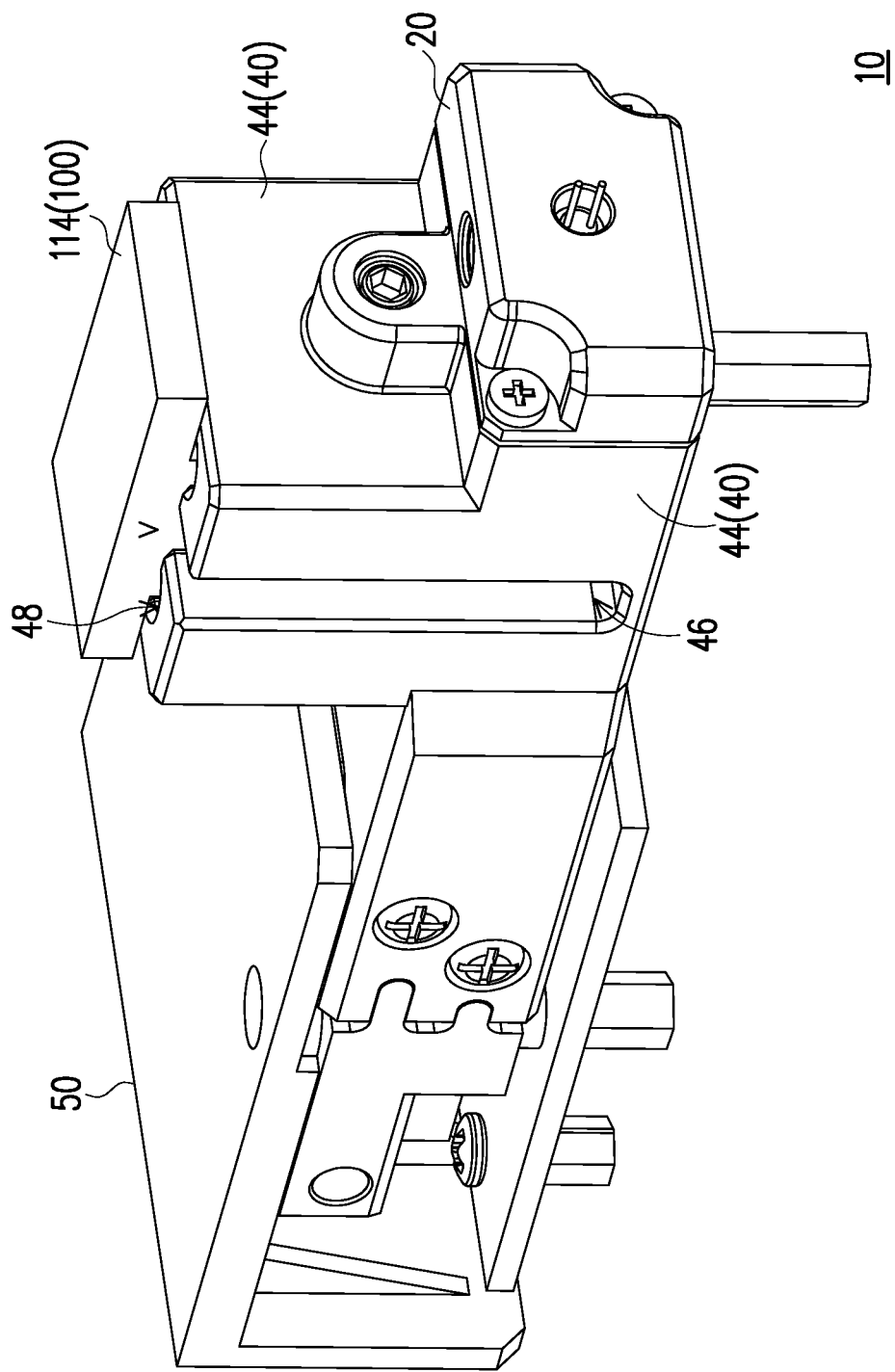
FIG. 1 is a schematic view illustrating a spectrometer according to an embodiment of the invention.
Figure 2:
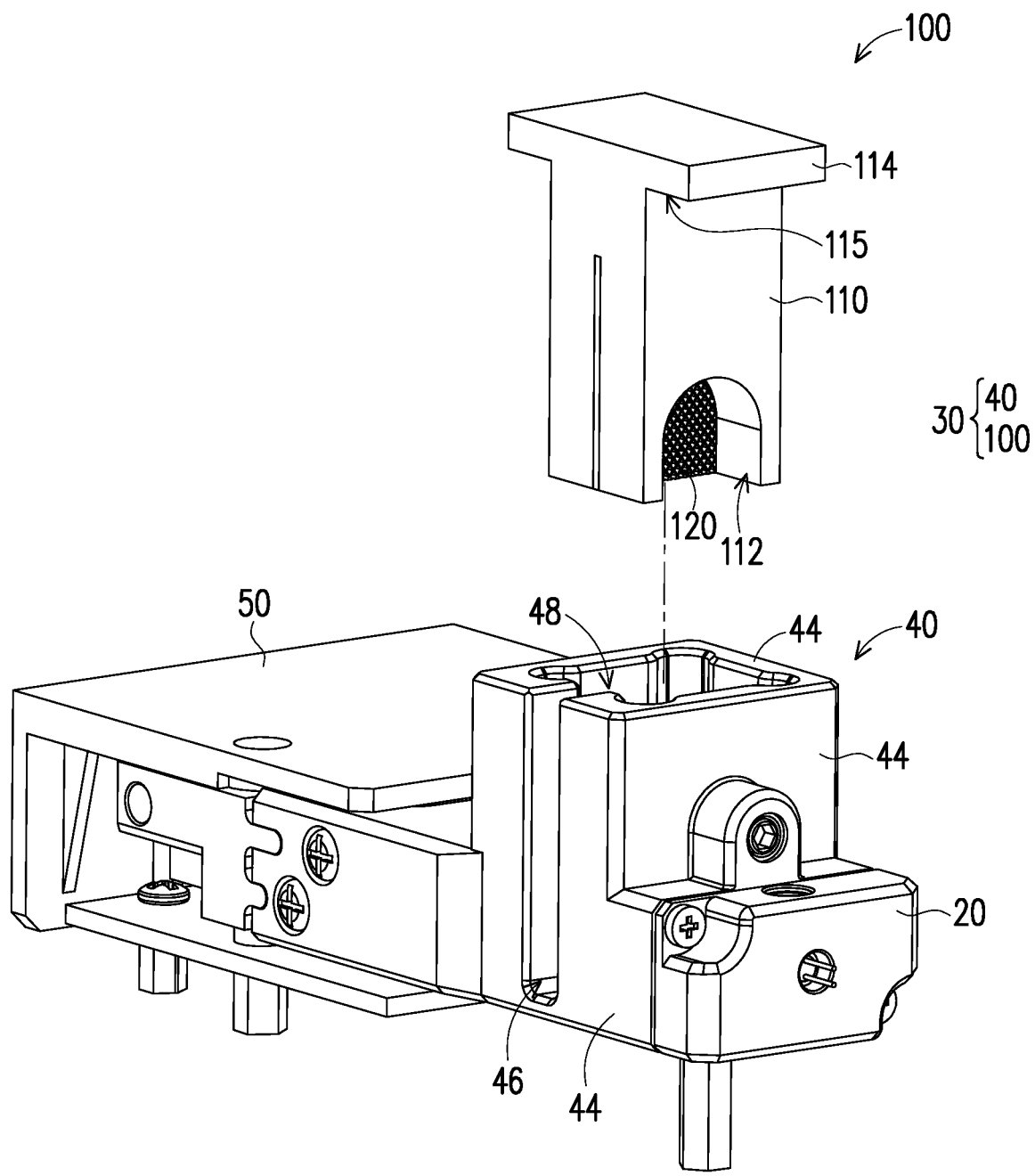
FIG. 2 is a schematic view illustrating the spectrometer of FIG. 1 from which a sample carrier is removed.
Figure 3A:
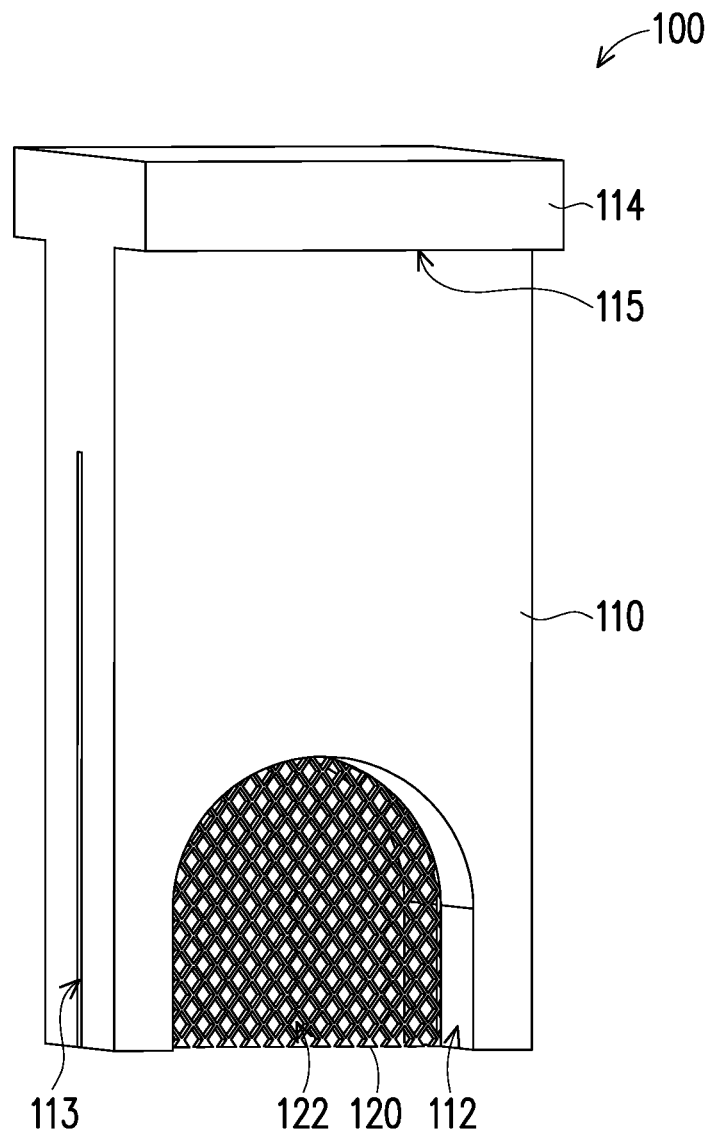
FIG. 3A is a schematic view of the sample carrier of FIG. 1.
Figure 3B:
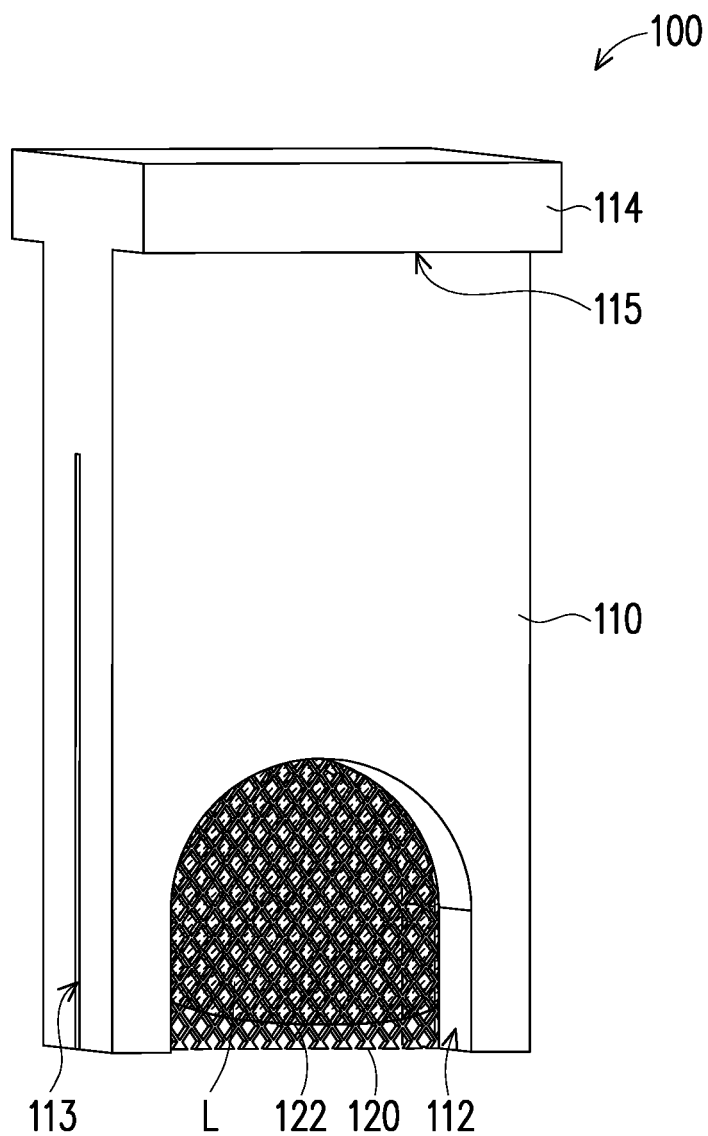
FIG. 3B is a schematic view of the sample carrier of FIG. 3A carrying a liquid sample.
Figure 4A:
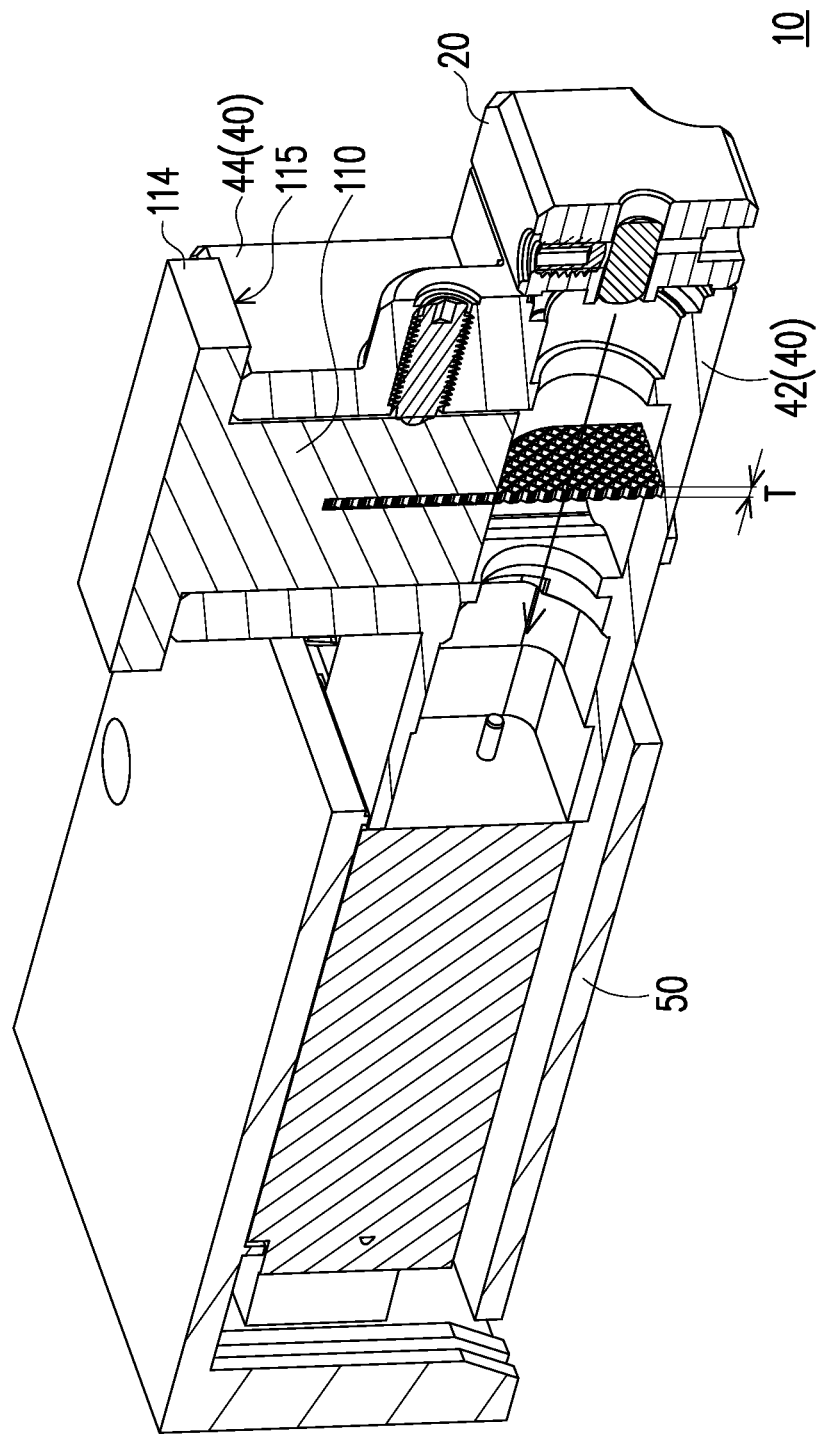
FIG. 4A is a schematic cross-sectional view illustrating the spectrometer of FIG. 1.

FIG. 1 is a schematic view illustrating a spectrometer according to an embodiment of the invention. FIG. 2 is a schematic view illustrating the spectrometer of FIG. 1 from which a sample carrier is removed. FIG. 3A is a schematic view of the sample carrier of FIG. 1. FIG. 3B is a schematic view of the sample carrier of FIG. 3A carrying a liquid sample. FIG. 4A is a schematic cross-sectional view illustrating the spectrometer of FIG. 1.

Referring to the drawings, in some embodiments, a spectrometer 10 includes a light source assembly 20, a transmissive sampling module 30, and an optical engine 50. The light source assembly 20 is configured to provide a beam. The transmissive sampling module 30 includes a supporting base 40, and a sample carrier 100. As shown in FIG. 4A, the supporting base 40 may be configured to locate a mesh-like carrier body 120 on the light path of the beam of the light source assembly 20. The optical engine 50 is configured to be connected with the transmissive sampling module 30. The beam of the light source assembly 20 may pass through a liquid sample L on the mesh-like carrier body 120 to be emitted toward the optical engine 50, so as to be measured. The optical engine 50 is configured to receive a sample beam to generate spectrum data.

In the embodiment, the light source assembly 20 may be directly connected to the supporting base 40. Specifically, the light source assembly 20 may be detachably connected to the supporting base 40 by locking, for example, for the convenience of replacing or maintaining the light source assembly 20. For example, an operator may, based on the needs, assemble light source assemblies 20 of various intensities, wavelengths, types (e.g., LED, laser, etc.), etc., to the supporting base 40 to cope with various measurement needs.

In other embodiments, the light source assembly 20 may also be aligned with and fixed to the supporting base 40 by engaging or other means. In addition, in other embodiments, the light source assembly 20 may also be connected with the supporting base 40 in a non-detachable manner (e.g., by soldering or integral formation). In this way, the relative positions between the light source assembly 20 and the supporting base 40 are fixed.

In some embodiments, the sample carrier 100 may carry the liquid sample L (shown in FIG. 3B), and the sample carrier 100 is pluggably disposed inside the supporting base 40. As shown in FIG. 2, in the embodiment, the sample carrier 100 includes a frame body 110 and the mesh-like carrier body 120. The frame body 110 has a notch 112 located at the bottom of the frame body 110. The mesh-like carrier body 120 is fixed to the frame body 110 and is located in the notch 112. In the embodiment, as shown in FIG. 3A, the frame body 110 may be provided with an opening 113 on a side, the mesh-like carrier body 120 may be sandwiched inside the opening 113, and the mesh-like carrier body 120 may be fixed, optionally or additionally, to the frame body 110 by adhesion. In other embodiments, the mesh-like carrier body 120 may also be fixed to the frame body 110 through melting or clamping. The invention does not intend to limit how the mesh-like carrier body 120 is fixed.

As shown in FIGS. 3A and 3B, in some embodiments, the mesh-like carrier body 120 has a plurality of apertures 122, and the liquid sample L may be retained in the apertures 122. In the embodiment, the mesh count of the mesh-like carrier body 120 may range between, for example, 10 and 100, and such size allows the liquid sample L to be retained inside the apertures 122 by cohesive force. However, the mesh count of the mesh-like carrier body 120 is not limited thereto. The mesh count here refers to the number of apertures of the mesh-like carrier body 120, and is commonly defined as the number of apertures within a 1-inch-by-1-inch area. For example, as the mesh count increases, the aperture size decreases, and the grain size of materials able to pass through also decreases. Comparatively, as the mesh count decreases, the aperture size increases, and the grain size of materials able to pass through also increases.

In the embodiment, a thickness T (FIG. 4A) of the mesh-like carrier body 120 may range between 0.05 millimeters and 1 millimeter, such as 0.3 millimeters. Since the thickness of the liquid sample L may be controlled through the thickness T of the mesh-like carrier body 120, the designer may set the thickness T of the mesh-like carrier body 120 according to features such as the type, concentration, light transmittance, etc., of the liquid sample L under measurement. Therefore, the light path is favorably under control within a short range. Here, the light path refers to a distance in which the beam travels through a liquid under measurement. For example, the liquid sample L whose light transmittance is low may be carried by a mesh-like carrier body 120 whose thickness T is small. Therefore, the spectrometer 10 can perform measurement even on the liquid sample L (e.g., milk or soy milk) whose light transmittance is low.

In the embodiment, the material of the mesh-like carrier body 120 does not absorb infrared light, such as metal (iron mesh). However, the material of the mesh-like carrier body 120 is not limited thereto. In other embodiments, the material of the mesh-like carrier body 120 may include a material with low infrared absorption, so as to prevent the measurement result from being affected. Since the mesh-like carrier body 120 is made of a rigid material, the mesh-like carrier body 120 may be used repetitively. Once washed and cleaned, the mesh-like carrier body 120 can be used for measurement again.

In the embodiment, the sample carrier 100 further includes a handle part 114 located at the top of the frame body 110 for easy retrieval by the operator. In addition, the handle part 114 has a positioning surface 115. The positioning surface 115 is configured to contact the top of the supporting base 40 to position the sample carrier 100 inside the supporting base 40. The mesh-like carrier body 120 may be positioned on the light path of the beam of the light source assembly 20 for measurement.

In addition, referring to FIGS. 2 and 4A, in the embodiment, the supporting base 40 includes a base plate 42 (FIG. 4A), a plurality of side walls 44 connected to the bottom plate 42, and an insertion port 48 located at the top. The insertion port 48 is provided for the sample carrier 100 to be inserted. In the embodiment, the number of the sidewalls 44 is four, for example. However, the number of the sidewalls 44 is not limited thereto. In other embodiments, the supporting base 40 may also be formed by a single hollow cylinder. In such case, the supporting base 40 is formed by one single sidewall 44. In other cases, the supporting base 40 may also be jointly formed by six or eight surrounding sidewalls 44.

In some embodiments, liquid may drip from the mesh-like carrier body 120. In order to prevent the dripping liquid from accumulating inside the supporting base 40 and affecting the measurement result, in the embodiment, one of the sidewalls 44 is provided with a liquid outlet 46 (FIG. 2). The position of the liquid outlet 46 may correspond to the position of the mesh-like carrier body 120 on the frame body 110. However, the invention is not limited thereto. It suffices as long as the liquid outlet 46 is set a position from which the dripping liquid can be discharged from the supporting case 40. Discharging the dripping liquid also prevents a lens set in the spectrometer from being contaminated.

In the embodiment, the liquid outlet 46 is configured as a slot extending, on one of the sidewalls 44, from an edge closest to the bottom plate 42 to an edge most distant to the bottom plate 42. In other words, in the embodiment, the length of the liquid outlet 46 is close to the height of the sidewall 44 on which the liquid outlet 46 is located. Of course, in other embodiments, it suffices as long as the liquid outlet 46 is provided close to the bottom plate 42 to prevent the dripping liquid from accumulating inside the supporting base 40 to the height at which the beam may pass through. The length of the liquid outlet 46 may also be smaller than the height of the sidewall 44 at which the liquid outlet 46 is located, such as ½ to ⅔ of the height of the sidewall 44. The liquid outlet 46 may also extend, on the sidewall 44 where the liquid outlet 46 is located, from the edge closest to the bottom plate 42 to an intermediate portion of the sidewall 44. However, how the liquid outlet 46 is configured shall not be limited by the drawings.

In addition, in the embodiment, the liquid outlet 46 is formed on the center of the sidewall 44 and keeps the same distance to the sidewalls 44 on the left and right. However, in other embodiments, it may also be that the liquid outlet 46 is not formed at the center of the sidewall 44 but is closer to the sidewall 44 on one of the sides. For example, in other embodiments, the number of the liquid outlet 46 may also be plural. For example, two liquid outlets 46 are formed on two opposite sidewalls 44. However, the number and locations of the liquid outlets 46 are not limited thereto. In an embodiment, the liquid outlet 46 may also be disposed on the bottom plate 42. However, the location of the liquid outlet 46 is not limited thereto.

In some embodiments, during an actual operation, the mesh-like carrier body 120 of the sample carrier 100 is immersed into a liquid under measurement. With the cohesive force of the liquid itself, when the liquid under measurement contacts the apertures of the mesh-like carrier body 120, the cohesive force exceeds gravity, and the liquid under measurement may be attached onto the mesh-like carrier body 120. The apertures 122 of the mesh-like carrier body 120 form a plurality of micro-spaces, and the liquid under measurement may be attached to the mesh-like carrier body 120 and fill the micro-spaces, thereby forming a film-like liquid sample L.

In some embodiments, the thickness of the mesh-like carrier body 120 also serves to control the thickness of liquid. For example, a thinner mesh-like carrier body 120 allows the liquid sample L attached to the mesh-like sample 120 to be film-like, and the thickness of such liquid sample L is less than 0.2 millimeters, for example. Such film-like liquid sample L reduces the light path and increases the amount of light. Accordingly, when the liquid under measurement that is denser or has a higher absorption is under measurement, a favorable absorption spectrum, such as a relatively linear absorption spectrum, can be attained. Furthermore, when the sample carrier 100 including the liquid sample L is inserted into the supporting base 40 of the spectrometer 10, extra liquid may flow out from the liquid outlet 46. Then, the device may be turned on to obtain the spectrum result of the liquid sample L.

Figure 4B:
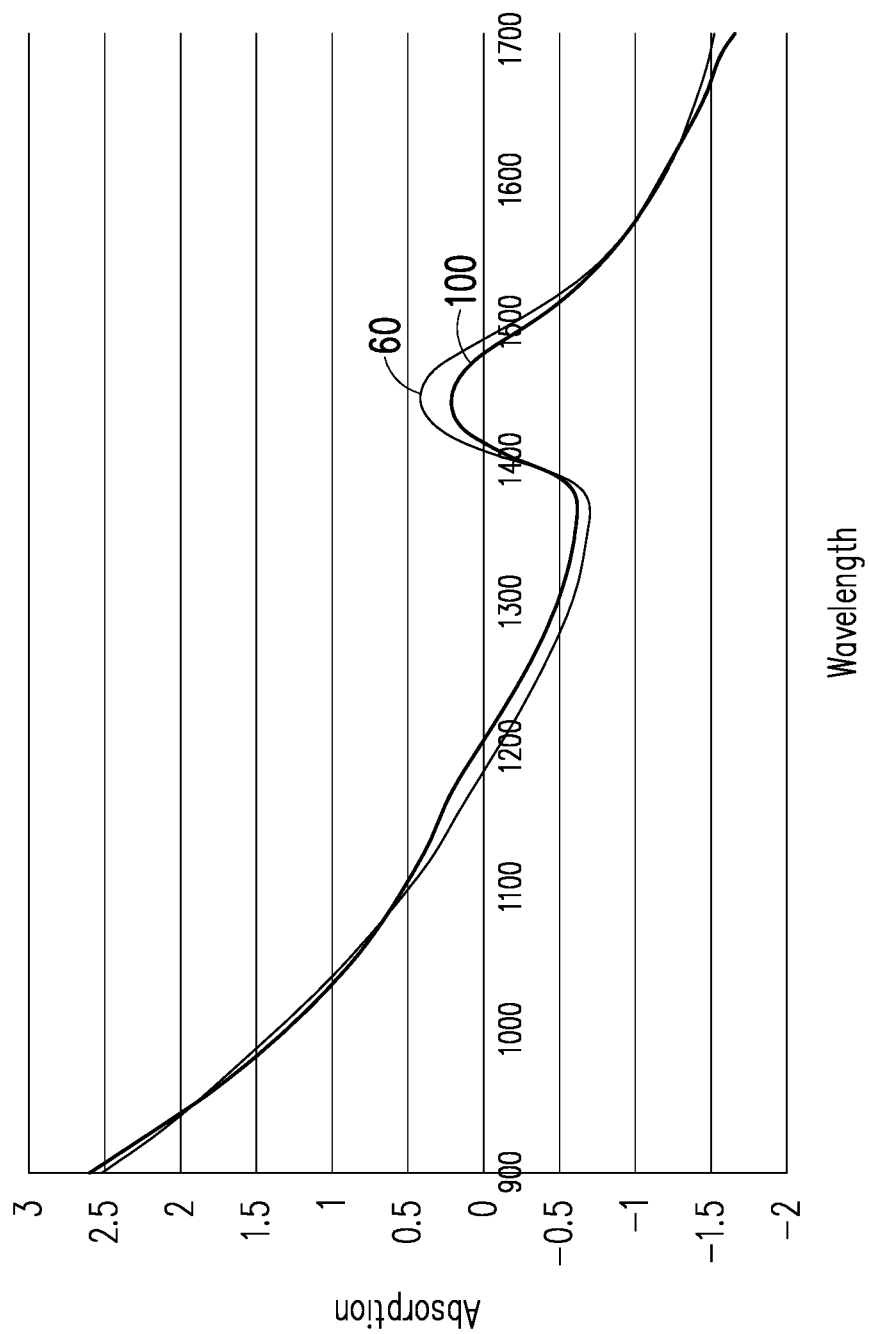
FIG. 4B is a schematic diagram illustrating measurement results of the sample carrier of FIG. 3A and a conventional glass slip carrier.

FIG. 4B is a schematic diagram illustrating measurement results of the sample carrier of FIG. 3A and a conventional glass slip carrier. Referring to FIG. 4B, the measurement result obtained from the liquid sample L carried by the sample carrier 100 of the embodiment is quite consistent with the measurement result obtained from the liquid sample L carried by a conventional glass slip carrier 60. Therefore, the sample carrier 100 of the embodiment can replace the conventional glass slip carrier 60 to be used in the measurement performed by the spectrometer 10 and exhibits favorable reliability.

In FIG. 3A, the shapes and sizes of the apertures 122 of the mesh-like carrier body 120 are the same. However, the form of the mesh-like carrier body 120 is not limited thereto. FIG. 5 is a schematic view illustrating a mesh-like carrier body according to another embodiment of the invention. Referring to FIG. 5, in the embodiment, apertures 122a and 124a of a mesh-like carrier body 120a have different shapes and sizes. Of course, in other embodiments, the apertures of the mesh-like carrier body may also have different sizes but the same shape, and shall not be limited to the drawings.

Figure 6:
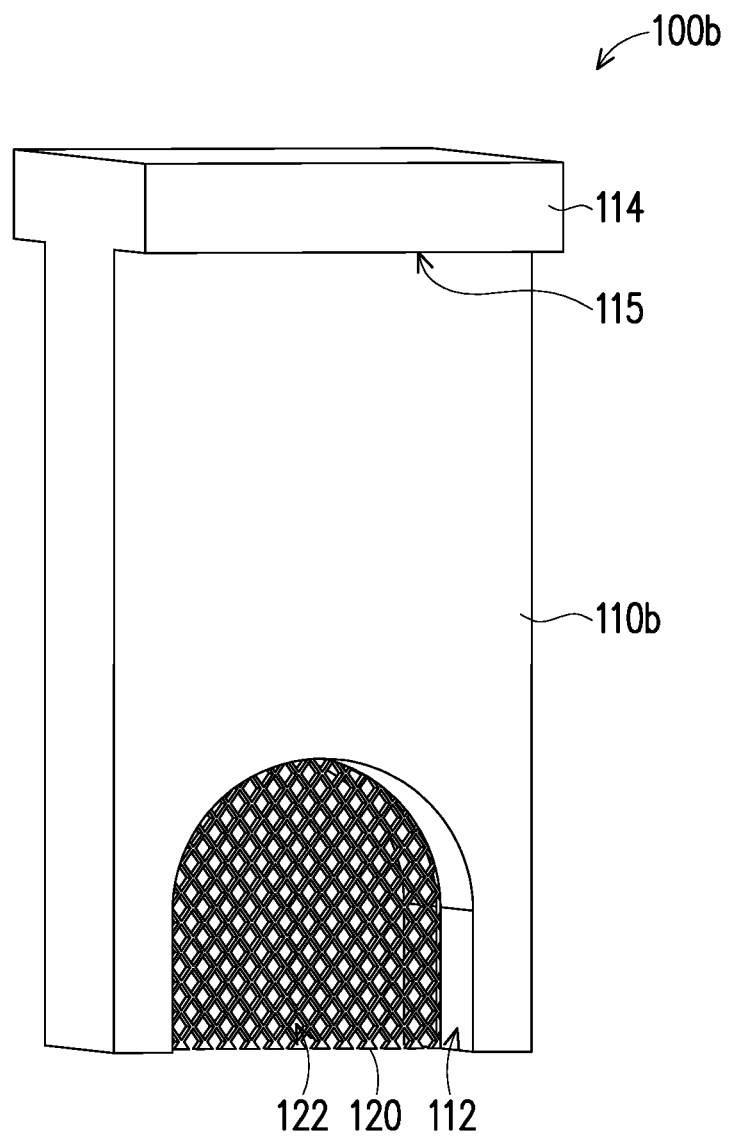
FIG. 6 is a schematic view illustrating a sample carrier according to another embodiment of the invention.

FIG. 6 is a schematic view illustrating a sample carrier according to another embodiment of the invention. Referring to FIG. 6, a sample carrier 100b of FIG. 6 differs from the sample carrier 100 of FIG. 3A mainly in that, in FIG. 3A, the mesh-like carrier body 120 and the frame body 110 are two components fixed to each other. In the embodiment, the mesh-like carrier body 120 and a frame body 110b are integrated. For example, the mesh-like carrier body 120 and the frame body 110b are formed integrally. The mesh-like carrier body 120 and the frame body 110b may be made of the same or different materials. With such design, the manufacturing processes can be reduced.

Figure 7:
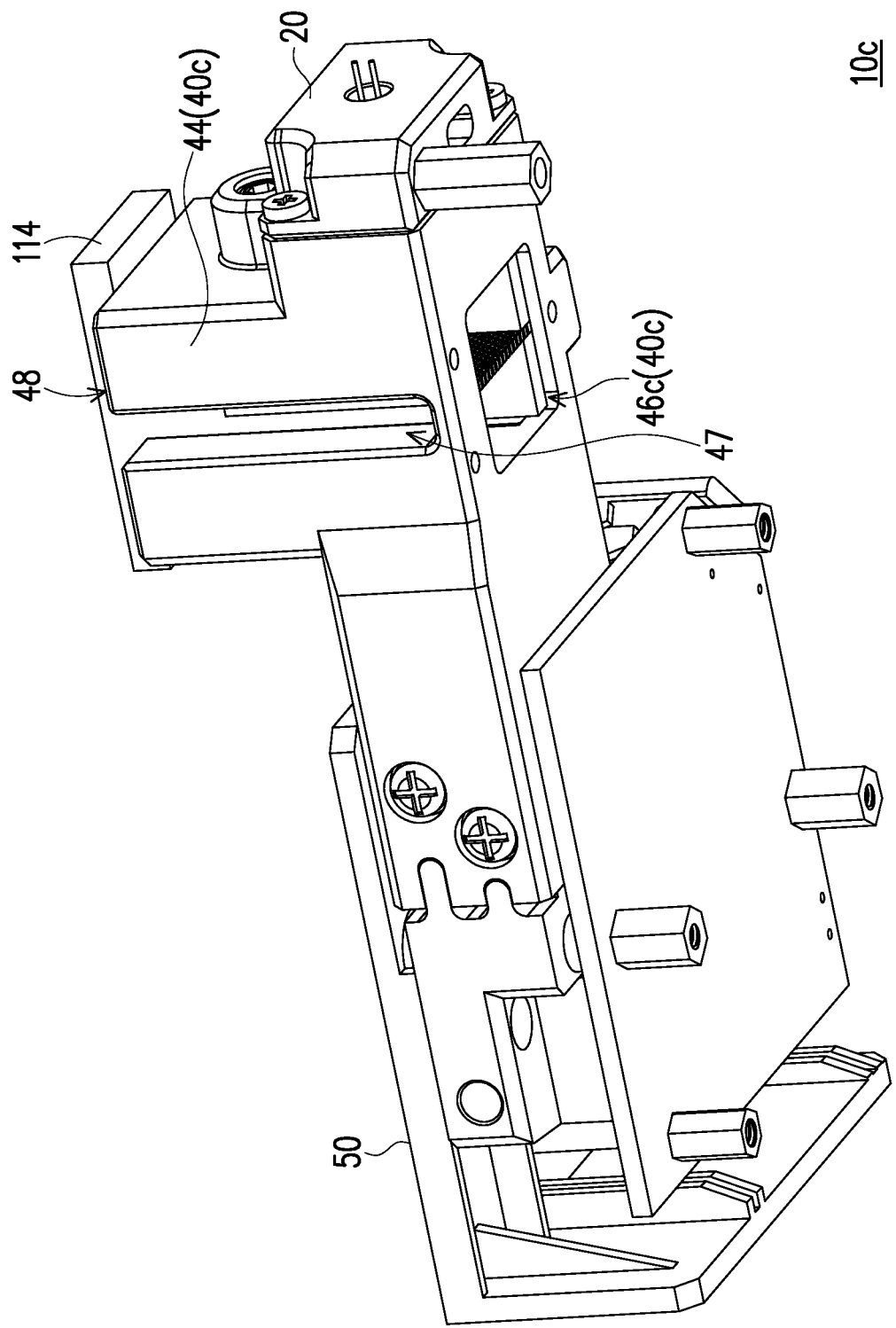
FIG. 7 is a schematic view illustrating a spectrometer according to another embodiment of the invention.
Figure 8:
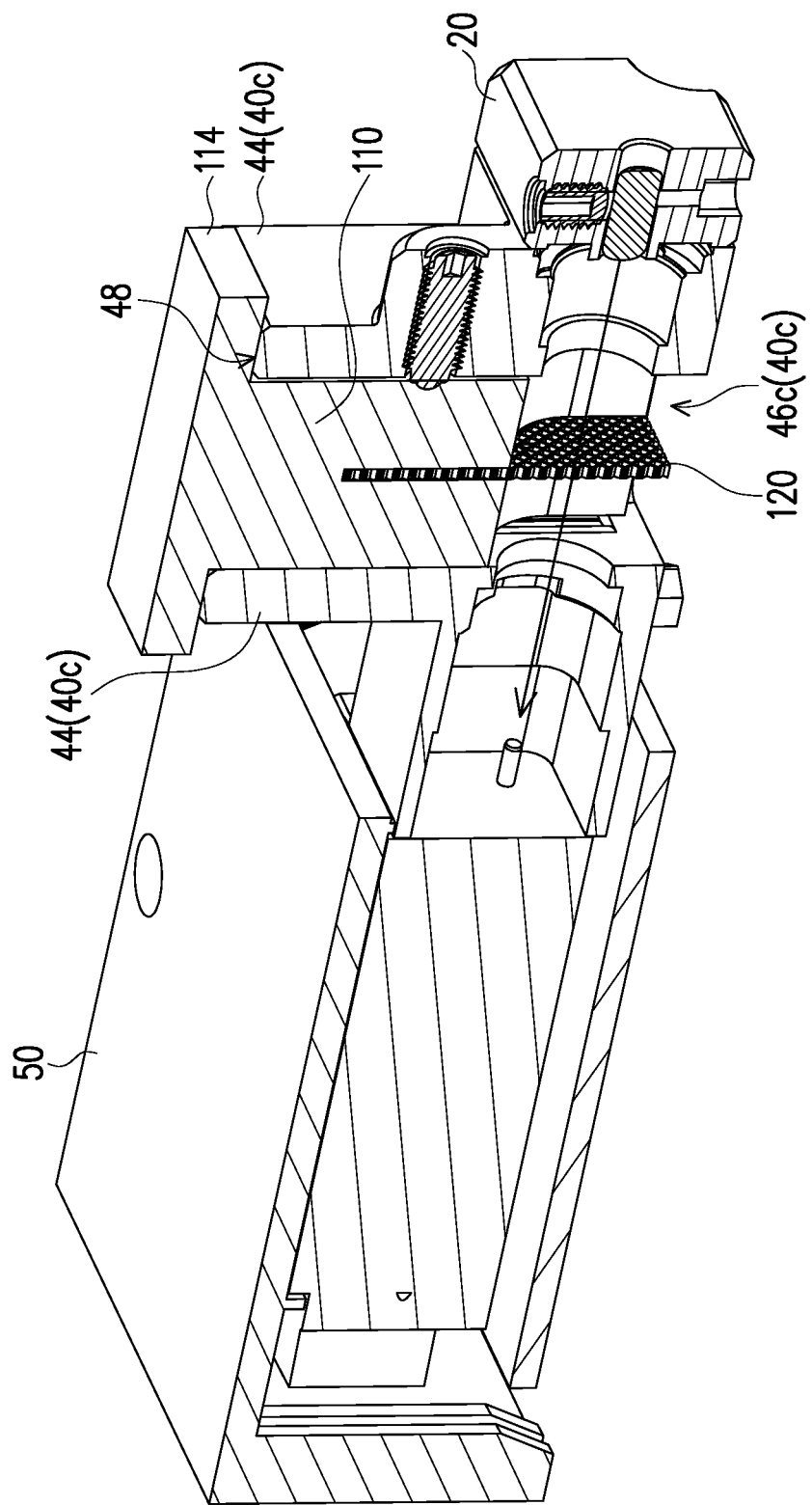
FIG. 8 is a schematic cross-sectional view illustrating the spectrometer of FIG. 7.

FIG. 7 is a schematic view illustrating a spectrometer according to another embodiment of the invention. FIG. 8 is a schematic cross-sectional view illustrating the spectrometer of FIG. 7. Referring to FIGS. 7 and 8, a spectrometer 10c of the embodiment differs from the spectrometer 10 mainly in that the supporting base 40 of the spectrometer 10 of FIG. 1 is provided with the bottom plate 42 (FIG. 4A), and extra liquid flows out from the liquid outlet 46 (FIG. 2) located on the sidewall 44. In the spectrometer 10c shown in FIG. 7, a supporting plate 40c is not provided with the bottom plate, but is in the form of a tubular body with open upper and lower ends. The tubular body is provided with the insertion port 48 located at the top and a liquid outlet 46c located at the bottom. The insertion port 48 is provided for the sample carrier 100 to be inserted. The liquid outlet 46c at the bottom is provided to discharge the extra liquid so as not to affect the measurement result. In addition, in the embodiment, a slot on the sidewall 44 may also serve as an observation port 47 for observing the situation inside the supporting base 40 or may serve as a second liquid outlet. In an embodiment, the observation port 47 may also be omitted.

In view of the foregoing, in the sample carrier of the spectrometer according to the embodiments of the invention, the mesh-like carrier body carries the liquid sample. Specifically, the mesh-like carrier body has a plurality of apertures, and the liquid sample may be retained in at least some of the apertures. Since the thickness of the liquid sample can be controlled through the thickness of the mesh-like carrier body, the light path can be favorably controlled within a thin range. In addition, the mesh-like carrier body may be disposed on the light path of the beam. In this way, the beam may pass through the liquid sample on the mesh-like carrier body and be emitted toward the optical engine, so as to measure the liquid sample.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A spectrometer, comprising: a light source assembly, a transmissive sampling module, and an optical engine,
    wherein the light source assembly is configured to provide a beam, and
    the transmissive sampling module comprises a supporting base and a sample carrier,
        wherein the supporting base is disposed on a light path of the beam of the light source assembly, and
        the sampling carrier is configured to carry a liquid sample and pluggably disposed inside the supporting base, and the sample carrier comprises a frame body and a mesh-like carrier body,
        wherein the frame body has a notch located at a bottom of the frame body, and
        the mesh-like carrier body is fixed to the frame body and located at the notch, the mesh-like carrier body is located on the optical path of the beam of the light source assembly, the mesh-like carrier body has a plurality of apertures, and the liquid sample is retained in at least some of the apertures, and
    the optical engine is configured to be connected to the transmissive sampling module, wherein the beam of the light source assembly passes through the liquid sample on the mesh-like carrier body to be emitted toward the optical engine.

2. The spectrometer as claimed in claim 1, wherein a thickness of the mesh-like carrier body ranges between 0.05 millimeters and 1 millimeter.

3. The spectrometer as claimed in claim 2, wherein the thickness of the mesh-like carrier body is 0.3 millimeters.

4. The spectrometer as claimed in claim 1, wherein the supporting base comprises a bottom plate and a plurality of sidewalls connected to the bottom plate, and one of the sidewalls is provided with a liquid outlet.

5. The spectrometer as claimed in claim 1, wherein the supporting base comprises a tubular body formed by a plurality of surrounding sidewalls, and the tubular body is provided an insertion port at a top and a liquid outlet at a bottom.

6. The spectrometer as claimed in claim 1, wherein a mesh count of the mesh-like carrier body ranges between 10 and 100.

7. The spectrometer as claimed in claim 1, wherein the sample carrier further comprises a handle part located at a top of the frame body and having a positioning surface for contacting the supporting base of the spectrometer.

8. The spectrometer as claimed in claim 1, wherein a material of the mesh-like carrier body does not absorb infrared light.

9. The spectrometer as claimed in claim 8, wherein the material of the mesh-like carrier body comprises metal.

10. The spectrometer as claimed in claim 1, wherein the mesh-like carrier body is fixed to the frame body by melting, adhesion or clamping.

11. The spectrometer as claimed in claim 1, wherein the mesh-like carrier body is integrated with the frame body.

* * * * *